(12) United States Patent
Ando (10) Patent No.: US 6,380,763 B1
(45) Date of Patent: Apr. 30, 2002

(54) CHARGE SWITCH CONTROL CIRCUIT

(75) Inventor: Tsutomu Ando, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/548,122

(22) Filed: Apr. 12, 2000

(30) Foreign Application Priority Data

Apr. 14, 1999 (JP) .......................................... 11-107074

(51) Int. Cl.[7] .......................................... H03K 19/0175
(52) U.S. Cl. .............................. 326/81; 326/68; 326/83
(58) Field of Search .............................. 326/80, 81, 82, 326/83, 86, 68

(56) References Cited

U.S. PATENT DOCUMENTS 5,367,645 A * 11/1994 Lubeck et al. .............. 395/325
5,742,178 A * 4/1998 Jenkins, IV et al. .......... 326/33

* cited by examiner

Primary Examiner—Michael Tokar
Assistant Examiner—Anh Q. Tran
(74) Attorney, Agent, or Firm—Adams & Wilks (57) ABSTRACT

A charge control circuit which prevents charging of a battery when a charger is connected to the battery when the voltage of the battery is not above a threshold voltage of a MOS inverter circuit. Under such a condition, a charge control switch is turned off and charging current is cut off so that charging of the abnormal battery is inhibited and destruction or explosion of the battery is prevented. First and second circuits monitor the battery voltage, the second circuit having for comparing the battery voltage to a threshold voltage of a MOS transistor, and a logic circuit performs a logic operation on the outputs of the two circuits so that charging of the battery is prevented when the battery voltage is not higher than the threshold voltage of the MOS transistor.

11 Claims, 9 Drawing Sheets

*prior art*

CHARGE SWITCH CONTROL CIRCUIT

BACKGROUND OF THE INVENTION

1. Field of the Invention

The present invention relates to a charge control circuit capable of controlling the charging of a secondary battery, and a rechargeable power source apparatus using the circuit.

2. Description of the Related Art

Figure 2:
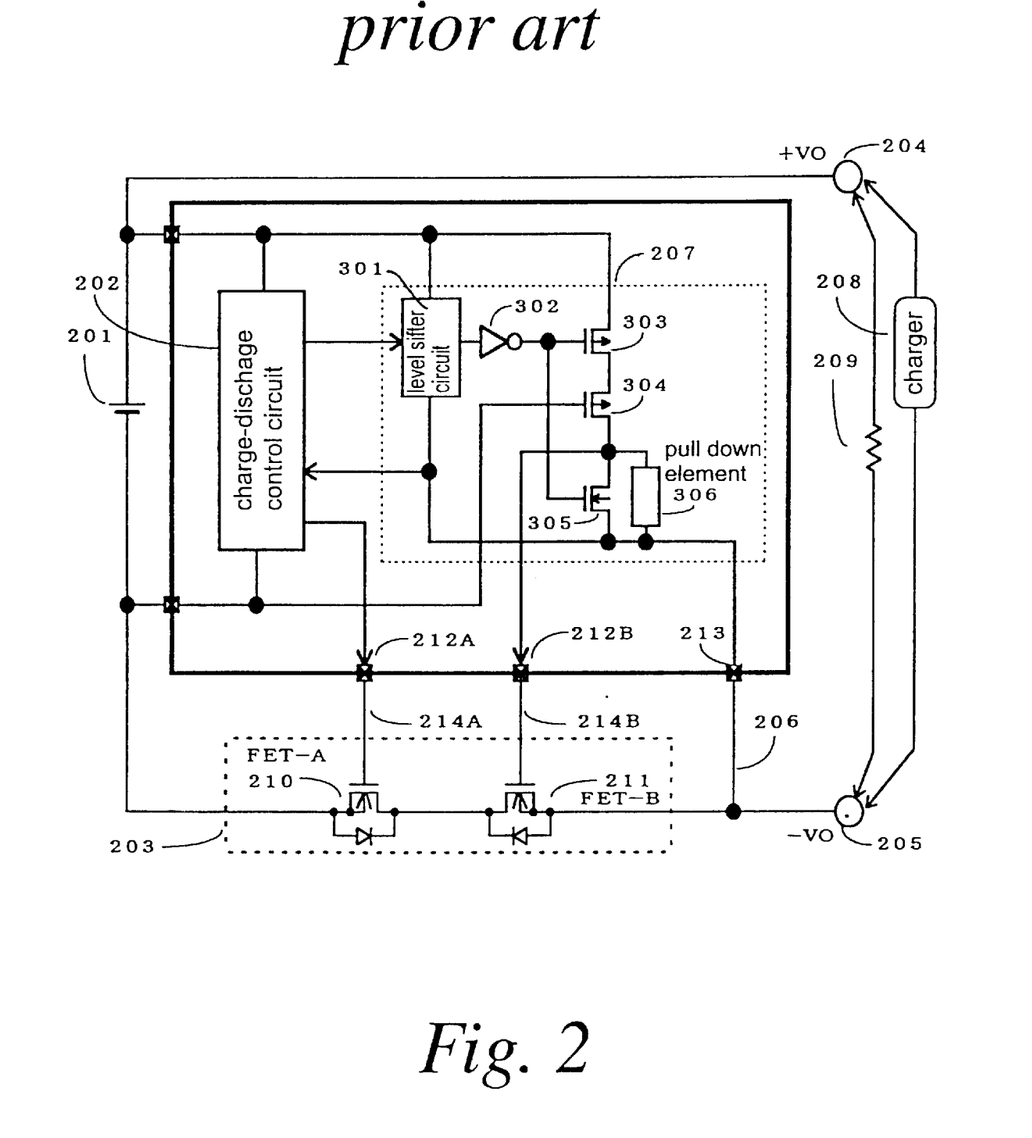
FIG. 2 is an explanatory view showing a circuit block of a conventional rechargeable power source apparatus.

As a conventional charge control circuit, there is known a circuit such as the circuit block diagram shown in FIG. 2. In such a circuit, in order to control a charger 208 through a voltage of a secondary battery 201, two systems of power sources, that is, the secondary battery 201 and the charger 208 exist in this charge control circuit. A charge-discharge control circuit 202 for monitoring the voltage of the secondary battery 201 and for controlling charge and discharge is operated by the secondary battery 201 as the power source, while a charge switch control circuit 207 for driving a charge control switch FET-B 211 is operated by the charger 208 or the secondary battery 201 through the FET as the power source. At this time, in the case where the voltage of the secondary battery 201 becomes the minimum operation voltage of the charge-discharge control circuit 202 or lower due to abnormal deterioration, breakage, short circuit, or the like of the secondary battery, the charge-discharge control circuit 202 with the power source of the secondary battery 201 does not operate normally, and the output to the charge switch control circuit 207 becomes unstable. Hence, it becomes impossible to operate the charge control switch FET-B normally. As a result, there is a possibility that abnormal charging is performed on the secondary battery 201. Thus, according to the charge switch control circuit 207 shown in FIG. 3, a lowering of voltage of the secondary battery 201 is detected through the threshold voltage of a MOS transistor 304, and charging to the abnormal battery is prohibited.

Figure 3:
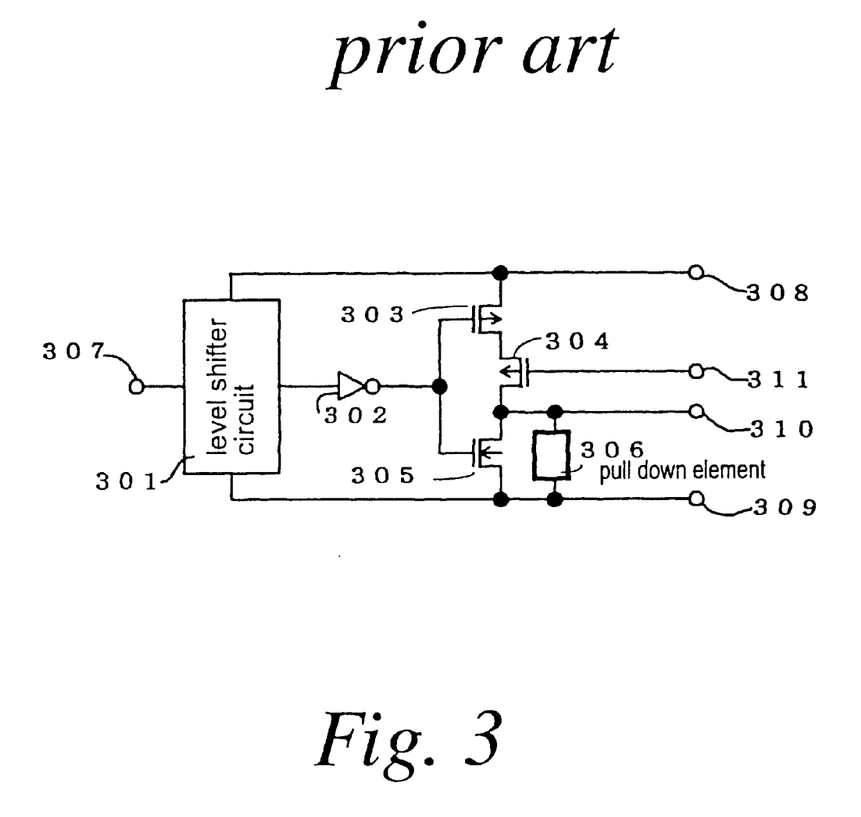
FIG. 3 is a circuit block diagram of a part of a conventional rechargeable power source apparatus.

In the case where the battery voltage of the secondary battery 201 is monitored through the threshold voltage of the MOS transistor 304, if the voltage of the secondary battery 201 is not higher than the threshold voltage of the MOS transistor 304, the charge control switch FET-B is turned off to prohibit charging. If the voltage of the secondary battery 201 is not lower than the minimum operation voltage of the charge-discharge control circuit 202, the charge control switch FET-B is turned on and charging is made possible. However, when the voltage of the secondary battery is in a region between the threshold voltage of the MOS transistor 304 and the minimum operation voltage of the charge control circuit 202, it is impossible to control whether the charge control switch should be tuned on or off. Moreover, even if the voltage of the secondary battery 201 is not higher than the threshold voltage of the MOS transistor 304, the charge control switch FET-B may be turned on by a leak current of the MOS transistor 304. As a result, there is a defect that charge prohibition can not be completely assured unless the voltage of the secondary battery 201 becomes sufficiently lower than the threshold voltage of the MOS transistor and becomes almost 0 V.

SUMMARY OF THE INVENTION

The present invention has been made to solve the problem of the conventional technique as described above. Therefore, an object of the present invention is to provide a charge control circuit having high reliability and safety in which a MOS inverter circuit is used so that when the voltage of a battery is not higher than a threshold voltage of a MOS transistor, a charge control switch is not turned on by a leak current of the MOS transistor, and when a charger is connected at the time when the voltage of the secondary battery is not higher than a threshold voltage of the Mos inverter circuit, charging current is made not to flow through the battery to cause such a state that charging can not be made.

In order to achieve the above object, in a charge control circuit according to the present invention, a circuit structure is designed such that in the case where a voltage of a secondary battery becomes a threshold voltage of a MOS inverter circuit or lower and a charger is connected at that time, a switch circuit is turned OFF and a charging current is made not to flow, so that charging is not conducted on a battery in an abnormal state.

In the charge control circuit structured as described above, if the charger is connected at the time of abnormal battery connection when the battery voltage is not higher than the threshold voltage of the MOS inverter circuit, the charging current is cut off and charging of the secondary battery becomes impossible. The circuit then operates to prevent breakage of the secondary battery, raising the reliability of the whole apparatus and improving safety.

DETAILED DESCRIPTION OF THE PREFERRED EMBODIMENTS

An embodiment of the invention will be described with reference to FIG. 1.

Figure 1:
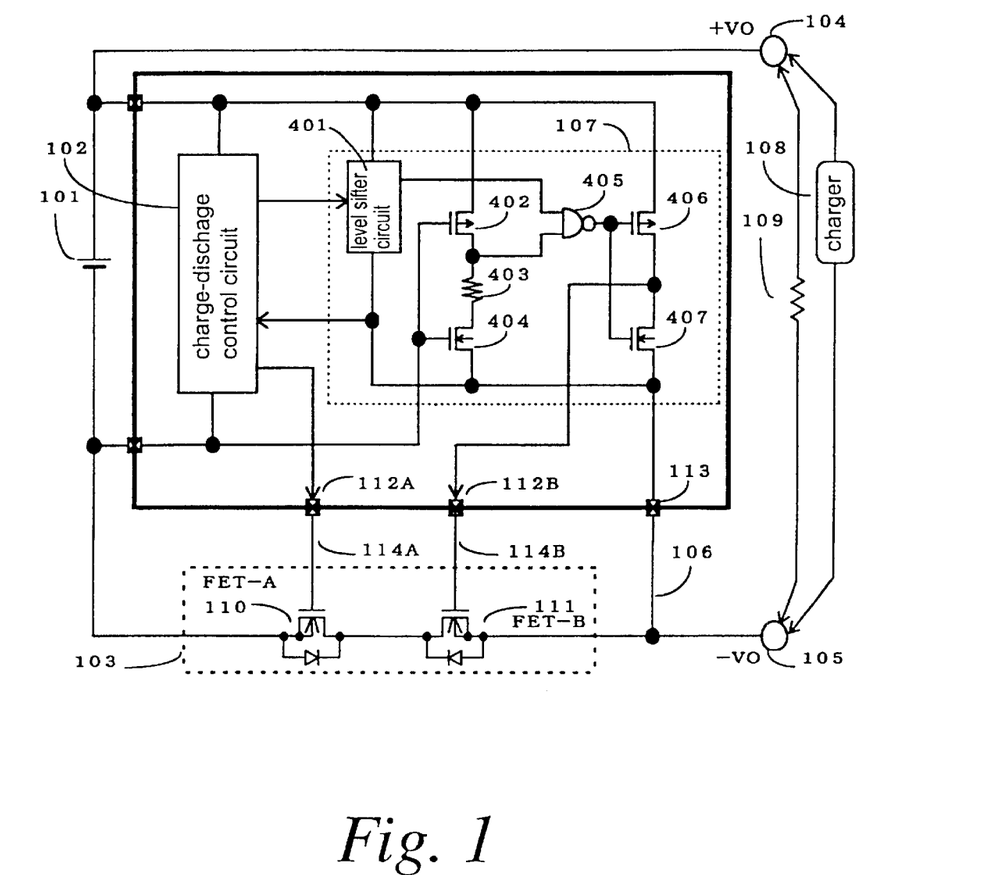
FIG. 1 is an explanatory view showing a circuit block of a rechargeable power source apparatus of the present invention.

FIG. 1 is a circuit block diagram of a charge control circuit including the present invention. A secondary battery 101 is connected with external terminals +VO 104 and −VO 105 through a switch circuit 103. The switch circuit 103 is constituted by two Nch FETs. The voltage of the secondary battery 101 is monitored by a charge-discharge control circuit 102 and a charge switch control circuit 107. The charge-discharge control circuit 102 is connected to an FET-A 110 through a signal line 114A, and controls the ON/OFF of the FET-A 110. The charge switch control circuit 107 is connected between the external terminals +VO 104 and −VO 105 in parallel with a charger through an overcurrent detection terminal 113, operates with the voltage as a power source, is connected to an FET-B 111 through a signal line 114B, and controls the ON/OFF of the FET-B 111.

A charger 108 for charging the secondary battery 101 and an apparatus (a load when viewed from the secondary battery) that can be driven by the secondary battery are connected between the external terminals +VO 104 and −VO 105. The FET-A 110 and FET-B 111 are connected in series with the external terminal −VO 105 or +VO 104.

First, a circuit structure of the charge switch control circuit 107 will be described with reference to FIG. 1. A signal from the charge-discharge control circuit 102 is inputted to a level shifter circuit 401. A battery voltage of the secondary battery 101 is inputted to a gate of a P-channel MOS transistor 402 and a gate of an N-channel MOS transistor 404 used as a battery voltage detecting circuit. A drain of the P-channel MOS transistor 402 is connected to a drain of the N-channel MOS transistor 404 through a resistance element 403. The output of the contact point between the drain of the P-channel MOS transistor 402 and the resistance element 403 and the output of the level shifter circuit 401 are inputted to an inversion logical AND generating circuit 405. The output of the inversion logical AND generating circuit 405 is inputted to a gate of a P-channel MOS transistor 406 and a gate of an N-channel MOS transistor 407. A drain of the P-channel MOS transistor 406 is connected to a drain of the N-channel MOS transistor 407, and the signal is transmitted to the gate of the FET-B 111 in the switch circuit 103 through a charge control signal output terminal 112B and through the signal line 114B. At this time, the power source of the respective components constituting the charge switch control circuit 107, that is, the level shifter circuit 401, the P-channel MOS transistors 402 and 406, the N-channel MOS transistors 404 and 407, the resistance element 403, and the inversion logical AND generating circuit 405 is supplied from the charger 108 through the external terminals +VO 104 and −VO 105. Alternatively, the power source is supplied from the secondary battery 101 through the FET-A 110 and FET-B 111 in the switch circuit 103 and through the external terminals +VO 104 and −VO 105.

Figure 4:
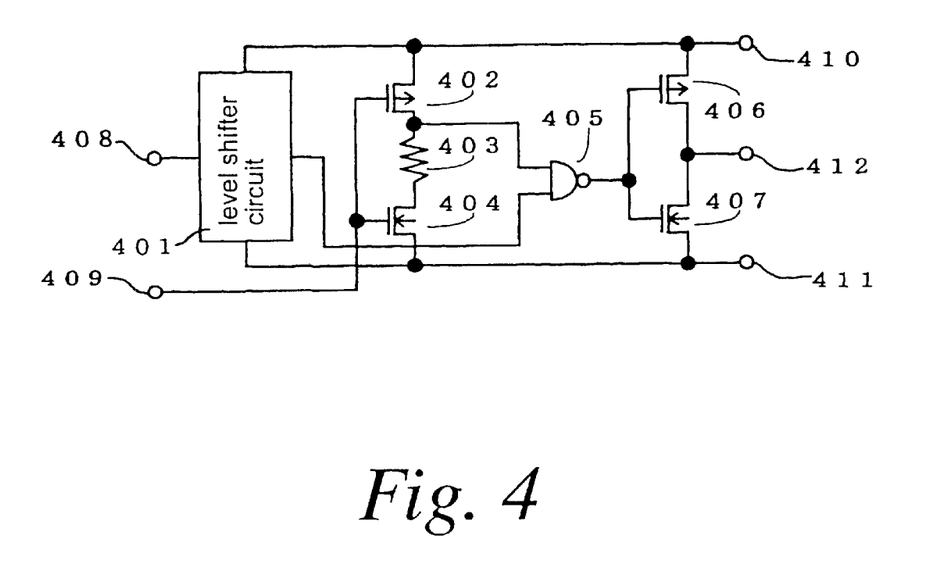
FIG. 4 is a circuit block diagram of a part of a rechargeable power source apparatus of the present invention.

FIG. 4 is a charge switch control circuit 207 in FIG. 1. The level shifter circuit 401 is connected to a power supply terminal with positive 308 and a power supply terminal with negative 309, and the level shifter circuit 401 has an input terminal 409. A first P-channel transistor 402 and N-channel transistor 404 are connected to a sensing terminal 409 and a second P-channel transistor 406 and a second N-channel transistor 411 are connected to output terminal 412.

The operation of the charge switch control circuit 107 will be described with reference to FIG. 1. When an input signal of the level shifter circuit 401, that is, an output signal of the charge-discharge control circuit 102 is in a high level, the level shifter circuit outputs the voltage (hereinafter referred to as "H") of the external terminal +VO 104, and when the output signal of the charge-discharge control circuit 102 is in a low level, the level shifter circuit outputs the voltage (hereinafter referred to as "L") of the external terminal −VO 105, which becomes an input of the inversion logical AND generating circuit 405. In the case where the voltage of the secondary battery 101 is lowered and becomes lower than the threshold voltage of the P-channel MOS transistor 402, the voltage detecting circuit of the secondary battery 101 constituted by the P-channel MOS transistor 402, the N-channel MOS transistor 404, and the resistance element 403, outputs "L" which is inputted to the inversion logical AND generating circuit 405. The output of the inversion logical AND generating circuit 405 drives the charge controlling FET-B 111 through an inversion output circuit constituted by the P-channel MOS transistor 406 and the N-channel MOS transistor 407. That is, only in the case where both the output of the level shifter circuit and the output of the secondary battery voltage detecting circuit are "H", the gate voltage of the charge controlling FET-B becomes "H" and charging becomes possible. On the contrary, if either one of the signals is "L", the gate voltage of the FET-B becomes "L", so that charging is prohibited.

Figure 5:
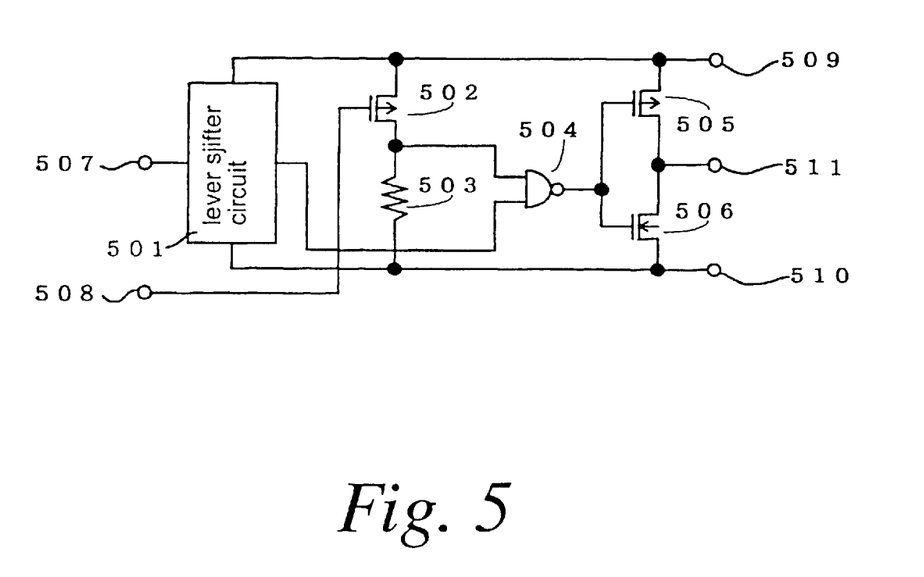
FIG. 5 is a circuit block diagram showing another embodiment of a part of a rechargeable power source apparatus of the present invention.

Although the above operation is for the case where the charge switch control circuit 107 is as shown in FIG. 4, the same operation can be realized even when a charge switch control circuit is that of FIG. 5. That is, a secondary battery detecting circuit is constituted by a P-channel MOS transistor 502 and a resistance element 503, and its output and the output of a level shifter circuit are subjected to the operation of logical AND, so that the same operation as that of circuit FIG. 4 becomes possible. In the case where the secondary battery voltage is not higher than the threshold voltage of the P-channel MOS transistor, the battery voltage detecting circuit outputs "L", so that even if the output of the level shifter circuit 401 as the other input of the inversion logical AND generating circuit 405 is "H", the output of the inversion logical AND generating circuit 405 becomes "H". As a result, the "L" signal inverted by the inversion output circuit is inputted to the gate of the charge controlling FET-B, so that the charge controlling FET-B is turned off, and charging is prohibited. When the voltage of the secondary battery 101 becomes the threshold voltage of the P-channel MOS transistor or higher, the P-channel MOS transistor is turned on and the output of the battery voltage detecting circuit is changed from "L" to "H". If the output of the level shifter circuit 401 as the other input of the inversion logical AND generating circuit 405 is "H", the output of the inversion logical AND generating circuit 405 becomes "L". As a result, the "H" signal inverted by the inversion output circuit is inputted to the gate of the charge controlling FET-B, so that the charge controlling FET-B is turned on, and charging becomes possible.

Next, another embodiment of the invention will be described with reference to FIG. 6. Similarly to the circuit of FIG. 4, the output of a charge-discharge control circuit becomes the input of a level shifter circuit 601, and its output becomes the input of an inversion logical OR generating circuit 606. The output of a battery voltage detecting circuit constituted by a P-channel MOS transistor 602, an N-channel MOS transistor 604, and a resistance element 603 becomes the input of an inverter circuit 605, and the output of the inverter circuit 605 becomes the input of the inversion logical OR generating circuit 606. The output of the inversion logical OR generating circuit to which the output of the level shifter circuit and the output of the battery voltage detecting circuit are inputted, is inputted to an inversion output circuit constituted by a P-channel MOS transistor 607 and a secondary battery 608. Further, the output of the inversion output circuit is inputted to the gate of a charge controlling FET.

The operation of the above embodiment of the present invention will be described with reference to FIG. 6. When the input signal of the level shifter circuit 601 is in a high level, the level shifter circuit outputs "H", and when its input signal is in a low level, the circuit outputs "L", which becomes the input of the inversion logical OR generating circuit 606. In the case where the voltage of the secondary battery is lowered and becomes lower than the threshold voltage of the P-channel MOS transistor 602, the battery voltage detecting circuit constituted by the P-channel MOS transistor 602, the N-channel MOS transistor 604, and the resistance element 603 outputs "L". This output becomes the input of the inverter circuit 605, which outputs "H" and becomes the input of the inversion logical OR generating circuit 606. Further, the output of the inversion logical OR generating circuit 606 drives the charge controlling FET-B through the inversion output circuit constituted by the P-channel MOS transistor 607 and the N-channel MOS transistor 608. In the case where the output of the level shifter circuit is "L", and the output of the battery voltage detecting circuit is "H", since the output of the inverter circuit 605 becomes "L", both inputs of the inversion logical OR generating circuit 606 become "L" and the output of the inversion logical OR generating circuit 606 becomes "H". Since this signal is inputted to the inversion output circuit, the gate voltage of the charge controlling FET-B becomes "L", and charging becomes impossible. Since the output of the inversion logical OR generating circuit 606 becomes "L" in the case other than the above, the gate voltage of the FET-B becomes "H", and charging becomes possible. Contrary to the circuit of FIG. 4 in this manner, the secondary battery with a battery voltage lower than the threshold value of the P-channel MOS transistor can be charged.

Figure 6:
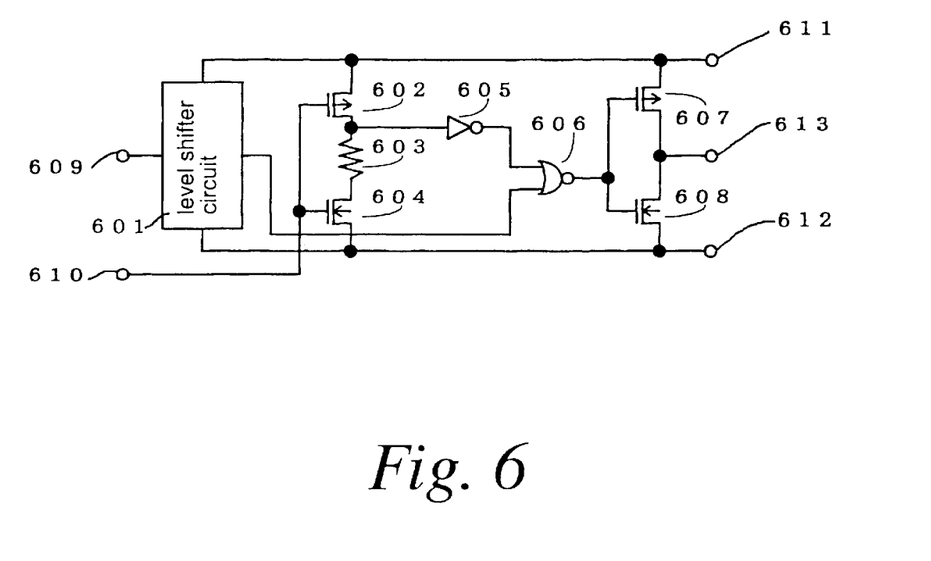
FIG. 6 is a circuit block diagram showing another embodiment of a part of a rechargeable power source apparatus of the present invention.
Figure 7:
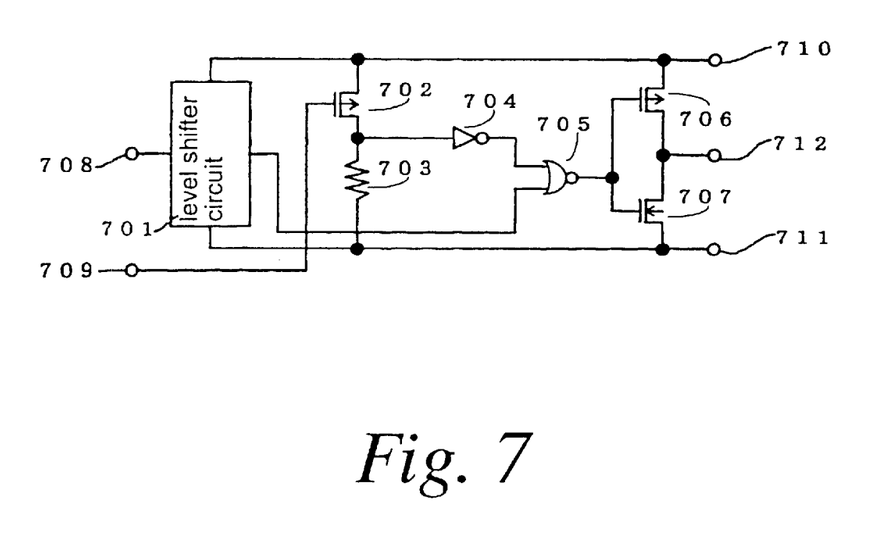
FIG. 7 is a circuit block diagram showing another embodiment of a part of a rechargeable power source apparatus of the present invention.

Although the above operation is for the case where the charge switch control circuit is as shown in FIG. 6, the same operation can be realized even in the case where a charge switch control circuit is that of FIG. 7. That is, a battery voltage detecting circuit is constituted by a P-channel MOS transistor 702 and a resistance element 703, its output is inverted by an inverter circuit 704, and the output of the inverter circuit and the output of a level shifter circuit are subjected to the operation of logical sum, so that the same operation as that of circuit FIG. 6 becomes possible. In the case where the voltage of the secondary battery is not higher than the threshold voltage of the P-channel MOS transistor, the battery voltage detecting circuit outputs "L". Thus, even if the output of a level shifter circuit 701 as the other input of an inversion logical OR generating circuit 705 is "H" or "L", the output of the inversion logical OR generating circuit 705 becomes "L". As a result, the "H" signal inverted by the inversion output circuit is inputted to the gate of the charge controlling FET-B, so that the charge controlling FET-B is turned on, and charging becomes possible. When the voltage of the secondary battery becomes the threshold voltage of the P-channel MOS transistor or higher, the P-channel MOS transistor is turned on, the output of the battery voltage detecting circuit is changed from "L" to "H", it becomes the input of the inverter circuit 704, and its output becomes "L". If the output of the level shifter circuit 701 as the other input of the inversion logical OR generating circuit 705 is "L", the output of the inversion logical OR generating circuit 705 becomes "H". As a result, the "L" signal inverted by the inversion output circuit is inputted to the gate of the charge controlling FET-B, so that the charge controlling FET-B is turned off, and charging is prohibited. Like this, only in the case where both inputs of the inversion logical OR generating circuit 705 are "L", charging is prohibited.

Figure 8:
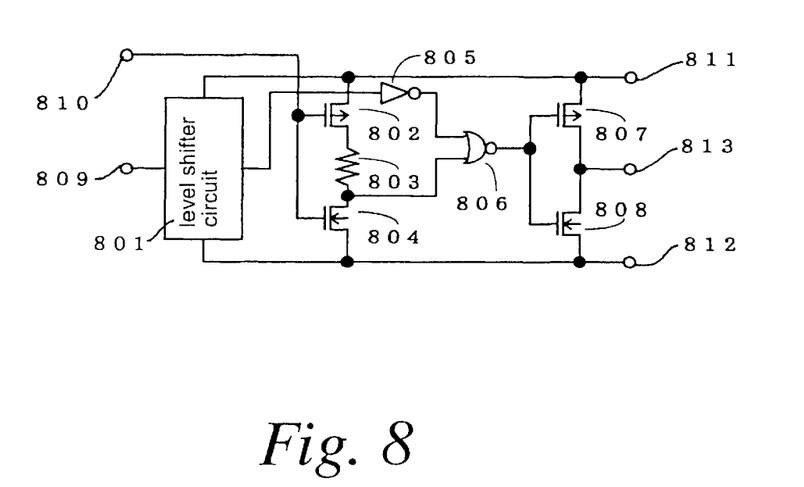
FIG. 8 is a circuit block diagram showing another embodiment of a part of a rechargeable power source apparatus of the present invention.

Although the above description has been made on the case where the Nch-FET is used for the switch circuit, even if a Pch-FET is used for a switch circuit, the same operation can be made. FIG. 8 is a charge switch control circuit for Pch-FET type switch circuit. An input terminal 809 is connected to level shifter circuit 801 and its output becomes the input of inverter circuit 805. The output of inverter circuit 805 becomes input of an inversion logical OR generation circuit 806. An output of battery voltage detecting circuit constituted by P-channel MOS transistor 805, an N-channel MOS transistor 804 and a resistance element 603 becomes the input of the inversion logical OR generation circuit 806. An detecting terminal 810 is connected to the P-channel MOS transistor 805, and the N-channel MOS transistor 804. The output of inversion logical OR generation circuit 806 is inputted to an inversion output circuit, comprises a P-channel MOS transistor and N-channel MOS transistor and the output of the inversion output circuit is outputted to the output terminal 813. The level shifter circuit 801, battery voltage detecting circuit and inversion output circuit are connected to positive power supply terminal 811 and negative power supply terminal 812.

Figure 9:
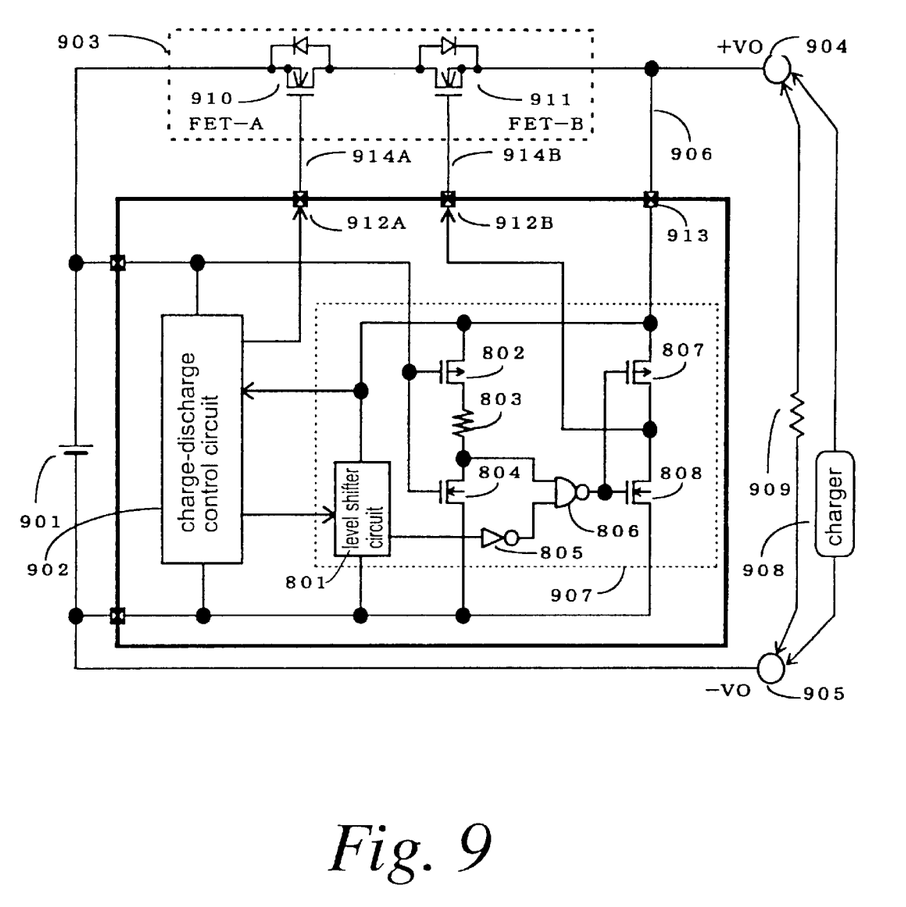
FIG. 9 is a circuit block diagram showing another embodiment of a rechargeable power source apparatus of the present invention.

A circuit using a Pch-FET will be described with reference to FIG. 9. The different point from FIG. 1 is that a switch circuit is constituted by a Pch-FET, not an Nch-FET. A secondary battery 901 is connected to external terminals +VO 904 and −VO 905 through a switch circuit 903. The switch circuit 903 is constituted by two Pch-FETs. The voltage of the secondary battery 901 is monitored by a charge-discharge control circuit 902 and a charge switch control circuit 907. The charge-discharge control circuit 902 is connected to an FET-A 910 through a signal line 914A, and controls the ON/OFF of the FET-A 910. The charge switch control circuit 907 is connected between the external terminals +VO 904 and −VO 905 through an overcurrent detection terminal 913 in parallel with a charger. The charge switch control circuit is operated by the voltage as a power source, is connected to an FET-B 911 through a signal line 914B, and controls the ON/OFF of the FET-B 911. A charger 908 for charging the secondary battery 901 and an apparatus driven by the secondary battery are connected between the external terminals +VO 904 and −VO 905. The FET-A 910 and FET-B 911 are connected in series to the external terminals −VO 905 or +VO 904.

A circuit structure of the charge switch control circuit 907 will be described with reference to FIG. 9. A signal from the charge-discharge control circuit 902 is inputted to a level shifter circuit 801. The battery voltage of the secondary battery 901 is inputted to the gate of a P-channel MOS transistor 802 and the gate of an N-channel MOS transistor 804 used as a battery voltage detecting circuit. Then the drain of the P-channel MOS transistor 802 is connected to the drain of the N-channel MOS transistor 804 through a resistance element 803. The output of the contact point between the drain of the N-channel MOS transistor 804 and the resistance element 803, and the output of the level shifter circuit 801 are inputted to an inversion logical OR generating circuit 806 through an inverter circuit 805. The output of the inversion logical OR generating circuit 806 is inputted to the gate of a P-channel MOS transistor 807 and the gate of an N-channel MOS transistor 808. The drain of the P-channel MOS transistor 807 is connected to the drain of the N-channel MOS transistor 808, and the signal is transmitted to the gate of the FET-B 911 in the switch circuit 903 through a charge control signal output terminal 912B and through the signal line 914B. At this time, the power source of the respective components constituting the charge switch control circuit 907, that is, the level shifter circuit 801, the P-channel MOS transistors 802 and 807, the N-channel MOS transistors 804 and 808, the resistance element 803, the inverter circuit 805, and the inversion logical OR generating circuit 806 is supplied from the charger 908 through the external terminals +VO 904 and −VO 905. Alternatively, the power source is supplied from the secondary battery 901 through the FET-A 910 and FET-B 911 in the switch circuit 903 and through the external terminals +VO 904 and −VO 905.

The operation of the charge switch control circuit 907 will be described with reference to FIG. 9. When the input signal of the level shifter circuit 801, that is, the output signal of the charge-discharge control circuit 902 is in a high level, the level shifter circuit outputs "H", and when the output signal of the charge-discharge control circuit 902 is in a low level, the level shifter circuit outputs "L", which becomes the input of the inversion logical OR generating circuit 806 through the inverter circuit 805. In the case where the voltage of the secondary battery 901 is lowered and becomes lower than the threshold voltage of the N-channel MOS transistor 804, the voltage detecting circuit of the secondary battery 901, constituted by the P-channel MOS transistor 802, the N-channel MOS transistor 804, and the resistance element 803, outputs "L", which becomes the input of the inversion logical OR generating circuit 806. Further, the output of the inversion logical OR generating circuit 806 drives the charge controlling FET-B 911 through an inversion output circuit constituted by the P-channel MOS transistor 807 and the N-channel MOS transistor 808. That is, only in the case where both the output of the level shifter circuit and the output of the voltage detecting circuit of the secondary battery are "H", the gate voltage of the charge controlling FET-B becomes "L", and charging becomes possible. In the case where either one of the signals of the level shifter circuit and the voltage detecting circuit of the secondary battery is "L", the gate voltage of the FET-B becomes "H", so that charging is prohibited. In this manner, not only the control signal from the charge-discharge control circuit as in the conventional circuit, but also the detection signal of the secondary battery is directly used, so that the charge and discharge control of the constant voltage battery can be realized.

As described above, according to the present invention, by merely adding a simple circuit, in the case where the charger is connected in the state when the voltage of the secondary battery becomes the threshold voltage of the MOS transistor or lower, the switch circuit is turned off and charging current is cut off, so that charging to the abnormal battery is prohibited. Thus, there are obtained effects that the destruction of the secondary battery is prevented, the reliability of the whole of an apparatus is raised, and the safety is improved.

What is claimed is:

1. A charge control circuit for controlling charging of a battery, comprising: a charge control switch disposed between the battery and a charger; a first battery voltage monitoring circuit for monitoring a voltage of the battery and outputting a first signal based on the monitored voltage; a second battery voltage monitoring circuit for monitoring the voltage of the battery and outputting a second signal based on the monitored voltage, the second battery voltage monitoring circuit having a threshold voltage lower than a minimum operating voltage of the first battery voltage monitoring circuit; and a logic circuit for performing a logic operation on the first and second signals output by the first and second battery voltage monitoring circuits and generating a control signal for controlling the charge control switch to permit or prevent charging of the battery based on a result of the logic operation.

2. A charge control circuit according to claim 1; wherein the second battery voltage monitoring circuit comprises a CMOS inverter circuit.

3. A charge control circuit according to claim 1; wherein the logic circuit comprises a NAND gate.

4. A charge control circuit according to claim 1; wherein the logic circuit comprises a NOR gate.

5. A charge control circuit according to claim 1; wherein the second battery voltage monitoring circuit compares the battery voltage to a threshold voltage of a MOS transistor.

6. A charge control circuit according to claim 1; wherein the second battery voltage monitoring circuit compares the battery voltage with the threshold voltage of a MOS transistor, and the control signal output by the logic circuit turns off the charge control switch when the battery voltage is lower than the threshold voltage of the MOS transistor so that charging of the battery by the charger is prohibited.

7. A charge switch control circuit for controlling a charge control switch of a power supply to permit or prevent charging of a battery, comprising: a charge control circuit for monitoring a voltage of the battery and producing a corresponding output signal; a CMOS inverter circuit for monitoring the voltage of the battery, the threshold voltage of the CMOS inverter circuit being lower than a minimum operating voltage of the charge control circuit; and a logic circuit for performing a logic operation on outputs of the charge control circuit and the CMOS inverter circuit and generating a control signal for controlling the charge control switch to permit or prevent charging of the battery.

8. A charge switch control circuit according to claim 7; wherein the logic circuit controls the charge control switch to prevent charging of the battery when the voltage of the battery is not higher than a threshold voltage of the CMOS inverter circuit.

9. A charge switch control circuit according to claim 7; wherein the logic circuit controls the charge control switch to permit charging of the battery when the voltage of the battery is not higher than a threshold voltage of the CMOS inverter circuit.

10. A charge switch control circuit according to claim 7; wherein the logic circuit comprises a NAND gate.

11. A charge switch control circuit according to claim 7; wherein the logic circuit comprises a NOR gate.

* * * * *